(12) United States Patent
Ganz

(10) Patent No.: US 8,826,383 B2
(45) Date of Patent: *Sep. 2, 2014

(54) TEMPORARY USER ACCOUNT FOR A VIRTUAL WORLD WEBSITE

(71) Applicant: Ganz, Woodbridge (CA)

(72) Inventor: Howard Ganz, North York (CA)

(73) Assignee: Ganz, Woodbridge, Ontario (*) Notice: Subject to any disclaimer, the term of this patent is extended or adjusted under 35 U.S.C. 154(b) by 0 days.

This patent is subject to a terminal disclaimer.

(21) Appl. No.: 13/941,751

(22) Filed: Jul. 15, 2013

(65) Prior Publication Data

US 2013/0304808 A1   Nov. 14, 2013

Related U.S. Application Data

(60) Continuation of application No. 13/170,531, filed on Jun. 28, 2011, now Pat. No. 8,516,553, which is a division of application No. 12/258,721, filed on Oct. 27, 2008, now Pat. No. 8,510,800.

(51) Int. Cl.
    *G06F 7/04*  (2006.01)
(52) U.S. Cl.
    USPC ................................. 726/3; 726/4; 709/203
(58) Field of Classification Search
    USPC ............................. 726/3, 4; 709/203
    See application file for complete search history.

(56) References Cited

U.S. PATENT DOCUMENTS

| | | | |
|---|---|---|---|
| 5,411,259 A | 5/1995 | Pearson | |
| 5,802,296 A | 9/1998 | Morse et al. | |
| 6,267,672 B1 | 7/2001 | Vance | |
| 6,343,990 B1 | 2/2002 | Rasmussen | |
| 6,616,532 B2 | 9/2003 | Albrecht | |
| 6,662,231 B1 | 12/2003 | Drosset et al. | |
| 6,663,105 B1 | 12/2003 | Sullivan et al. | |
| 6,758,746 B1 | 7/2004 | Hunter et al. | |
| 6,773,325 B1 | 8/2004 | Mawle et al. | |

(Continued)

FOREIGN PATENT DOCUMENTS

| | | |
|---|---|---|
| GB | 2365364 | 2/2002 |
| JP | 2002063092 | 2/2002 |

(Continued)

OTHER PUBLICATIONS

Grace, "Web Site Tycoon's Next Goal: Sixth Grade"; Woonsocket Call, Jun. 19, 2002.

(Continued)

*Primary Examiner* — Krista Zele
*Assistant Examiner* — James Forman
(74) *Attorney, Agent, or Firm* — Pearne & Gordon LLP

(57) ABSTRACT

A computer system and method are provided that facilitate permitting temporary access to a website or other computer application in which temporary access is given to a generic virtual character and its corresponding user. Temporary access is made available through a temporary user account that is set up by the user. The temporary user account is active for a limited time and allows the user to learn about the website, for instance, via the generic virtual character. The generic virtual character has limited access to the website and in particular to various activities or areas on the website. After a temporary account expires, it is purged from the system and associated virtual currency and virtual items are no longer accessible. Users who have purchased a real world item and have created a premium user account have full ongoing access to the website via their corresponding premium virtual characters.

20 Claims, 5 Drawing Sheets

(56) References Cited

U.S. PATENT DOCUMENTS

| | | |
|---|---|---|
| 6,910,186 B2 | 6/2005 | Kim |
| 7,039,940 B2 | 5/2006 | Weatherford |
| 7,094,154 B2 | 8/2006 | Kellerman et al. |
| 7,171,154 B2 | 1/2007 | Fujisawa et al. |
| 7,191,220 B2 | 3/2007 | Ohwa |
| 7,208,669 B2 | 4/2007 | Wells et al. |
| 7,249,139 B2 | 7/2007 | Chuah et al. |
| 7,279,063 B2 | 10/2007 | Yokajty et al. |
| 7,314,407 B1 | 1/2008 | Pearson |
| 7,478,047 B2 | 1/2009 | Loyall et al. |
| 7,556,563 B2 | 7/2009 | Ellis et al. |
| 7,587,502 B2 | 9/2009 | Crawford et al. |
| 7,636,783 B2 | 12/2009 | Heutchy et al. |
| 8,108,515 B2 | 1/2012 | Crawford et al. |
| 2002/0022992 A1 | 2/2002 | Miller et al. |
| 2002/0022993 A1 | 2/2002 | Miller et al. |
| 2002/0022994 A1 | 2/2002 | Miller et al. |
| 2002/0040327 A1 | 4/2002 | Owa |
| 2003/0222902 A1 | 12/2003 | Chupin et al. |
| 2004/0003398 A1 | 1/2004 | Donian et al. |
| 2004/0043806 A1 | 3/2004 | Kirby |
| 2004/0093266 A1 | 5/2004 | Dohring |
| 2004/0193489 A1 | 9/2004 | Boyd et al. |
| 2004/0242326 A1 | 12/2004 | Fujisawa |
| 2005/0059483 A1 | 3/2005 | Borge |
| 2005/0137015 A1 | 6/2005 | Rogers et al. |
| 2005/0177428 A1 | 8/2005 | Ganz |
| 2005/0250415 A1 | 11/2005 | Barthold |
| 2005/0250416 A1 | 11/2005 | Barthold |
| 2006/0093142 A1 | 5/2006 | Schneier et al. |
| 2006/0148567 A1 | 7/2006 | Kellerman et al. |
| 2006/0178976 A1 | 8/2006 | Vu |
| 2006/0281555 A1 | 12/2006 | Kellerman et al. |
| 2007/0073582 A1 | 3/2007 | Jung et al. |
| 2007/0082738 A1 | 4/2007 | Fickie et al. |
| 2007/0112624 A1 | 5/2007 | Jung et al. |
| 2007/0130001 A1 | 6/2007 | Jung et al. |
| 2007/0266062 A1 | 11/2007 | Young |
| 2008/0086777 A1 | 4/2008 | Sanchez |
| 2008/0098064 A1 | 4/2008 | Sherinian |
| 2008/0141367 A1 | 6/2008 | Ganz |
| 2008/0146340 A1 | 6/2008 | Ami |
| 2008/0163055 A1 | 7/2008 | Ganz |
| 2009/0019154 A1 | 1/2009 | Crawford et al. |
| 2009/0191970 A1 | 7/2009 | Avent |
| 2009/0191971 A1 | 7/2009 | Avent |
| 2009/0318229 A1 | 12/2009 | Zielinski et al. |

FOREIGN PATENT DOCUMENTS

| | | |
|---|---|---|
| WO | 01/69829 A2 | 1/2001 |
| WO | 0169830 A1 | 9/2001 |
| WO | 0222224 A1 | 3/2002 |

OTHER PUBLICATIONS http://web.archive.org.web.20031202190119/www.monopets.com/, Dec. 2, 2003.

Everquest Free for a Month, www.insidemacgames.com/news/story.php?ArticleID=1 0342, Pub Date: Oct. 24, 2004.

"Everquest Manual". Pub. Date: 2002, pp. 7 and 28.

"Aeria Online," p. 4, published Aug. 7, 2007.

TEMPORARY USER ACCOUNT FOR A VIRTUAL WORLD WEBSITE

CROSS-REFERENCE TO RELATED APPLICATIONS

This application is a continuation of U.S. patent application Ser. No. 13/170,531 filed on Jun. 28, 2011, which is a division of U.S. patent application Ser. No. 12/258,721 filed on Oct. 27, 2008, the entire contents of each of which is hereby incorporated by reference herein.

BACKGROUND OF THE INVENTION

1. Field of the Invention

This application relates generally to a method for providing temporary access to a website that provides virtual characters in virtual world, and more specifically to providing temporary access to a generic virtual character in order to provide a preview of the website.

2. Description of the Related Art

The Internet has given rise to numerous interactive entertainment websites in which users can participate in various activities, including games and chat rooms, for free. In some cases, advertisements are displayed to the users in order to generate revenue for the owners of the websites. However, the revenue generated by these sites is limited, since there is no requirement that the user actually purchases the products or services contained in the advertisements. In order to generate additional revenue, some entertainment websites limit access to users who have purchased a product, service or a subscription to the site.

Other entertainment websites have incorporated incentive-based systems in which purchasers of products or services are provided access to additional web content. In these websites, access to web content, such as games, is provided to all users for free. However, certain content, such as additional games or enhanced game play, is limited to users who enter a secret code that unlocks the content. The secret code can be provided to the user upon purchasing a product or service. For example, U.S. Pat. No. 6,267,672 to Vance, describes a remotely accessible game, such as an internet game, to encourage consumers to purchase a product. Consumers who purchase a product receive access information, such as a website URL and a code, which the consumer may then use to access and participate in the remotely accessible game.

More recently, entertainment websites have been developed in which the web-site content is directly tied to a product that is purchased by a user. For example, as disclosed in United States Patent Application Publication No. 2005/0192864 to Ganz, incorporated herein by reference, a user purchases a toy that includes a secret registration code provided in the toy packaging. Access to a certain interactive content on the website provided by the manufacturer of the toy is restricted to users who purchase a toy. When the user carries out a registration process on the manufacturer's website, which involves entering the registration code, a virtual world is presented to the user. The virtual world includes a virtual toy corresponding to the toy purchased by the user. The user can participate in various interactive activities involving the virtual toy. The user may then purchase additional toys and enter the registration codes provided with those toys to add additional virtual toys to the virtual world. These virtual toys can interact with each other, thereby enhancing the user's entertainment experiences. Further, after a predetermined period of time has lapsed since the registration code was registered, access to the website can be temporarily suspended until an additional purchase is made and a new registration code is registered. Thus, for these reasons, users are encouraged to continue to purchase additional toys in order to obtain additional registration codes.

SUMMARY OF THE INVENTION

Discussed herein below are methods and an apparatus that facilitate providing temporary access to a user and a corresponding generic virtual character in order to provide a preview of a website or other computer application. An exemplary method involves serving virtual world content stored on a server to a website over the Internet, the virtual world content including a plurality of activities in a virtual world and virtual character content, the virtual character content including a plurality of virtual characters that interact with the plurality of activities in the virtual world, the plurality of virtual characters including a plurality of virtual replicas and a plurality of generic virtual characters; validating a registration code that is associated with a product; responsive to the validating the registration code, permitting user control of a virtual replica of the product in the virtual world content via a user account, the virtual replica being one of the plurality of virtual replicas, and the user account being one of a plurality of premium user accounts; responsive to a request for a temporary user account without said validating said registration code, permitting user control of one of the plurality of generic virtual characters via the temporary user account for a limited time, and the temporary user account being one of a plurality of temporary user accounts; permitting interaction of the virtual replica with another one of the plurality of virtual replicas in the virtual world; and preventing at least some interaction of any of the plurality of generic virtual characters with any of the plurality of virtual replicas, wherein access to the plurality of activities via the virtual world content is provided exclusively to a plurality of authorized user accounts, the plurality of authorized user accounts consisting of the plurality of premium user accounts and the plurality of temporary user accounts.

Another exemplary method involves serving virtual world content stored on a server to a website over the Internet, the virtual world content including a plurality of activities in a virtual world and virtual character content, the virtual character content including a plurality of virtual characters that interact with the virtual world content forming the plurality of activities in the virtual world, the plurality of virtual characters including a plurality of premium virtual characters and a plurality of generic virtual characters; responsive to authenticating one of a plurality of paid user accounts which requires a user having paid for access, permitting user control of a premium virtual character via said one of the plurality of paid user accounts, the premium virtual character being one of the plurality of premium virtual characters; and responsive to a request for a temporary user account which does not require a user having paid for access, permitting user control of a generic virtual character via the temporary user account, where the temporary user account permits said user control only for a limited time, the generic virtual character having a generic visual appearance that is different from visual appearances of the plurality of premium virtual characters, and the temporary user account being one of a plurality of temporary user accounts, wherein access to the plurality of activities via the virtual world content is provided exclusively to a plurality of authorized user accounts, the plurality of authorized user accounts consisting of the plurality of paid user accounts and the plurality of temporary user accounts.

An exemplary computer system includes a virtual world subsystem that generates virtual world content including a plurality of activities in a virtual world and virtual character content, the virtual character content including a plurality of virtual characters that interact with the plurality of activities in the virtual world, the plurality of virtual characters including a plurality of virtual replicas and a plurality of generic virtual characters; a storage subsystem that stores the virtual world content; a registration subsystem validating a registration code that is associated with a product; and a server subsystem that serves the virtual world content to a website on the Internet and, responsive to the validating the registration code, permits user control of a virtual replica of the product in the virtual world content via a user account, the virtual replica being one of the plurality of virtual replicas, and the user account being one of a plurality of premium user accounts, wherein, responsive to a request for a temporary user account without said validating said registration code being received by the registration subsystem, the virtual world subsystem permits user control of one of the plurality of generic virtual characters via the temporary user account for a limited time, and the temporary user account being one of a plurality of temporary user accounts, wherein the virtual world subsystem permits interaction of the virtual replica with another one of the plurality of virtual replicas in the virtual world, wherein the virtual world subsystem prevents at least some interaction of any of the plurality of generic virtual characters with any of the plurality of virtual replicas, and wherein the virtual world subsystem provide access to the plurality of activities via the virtual world content exclusively to a plurality of authorized user accounts, the plurality of authorized user accounts consisting of the plurality of premium user accounts and the plurality of temporary user accounts.

DETAILED DESCRIPTION OF THE EXAMPLE EMBODIMENTS

Figure 1:
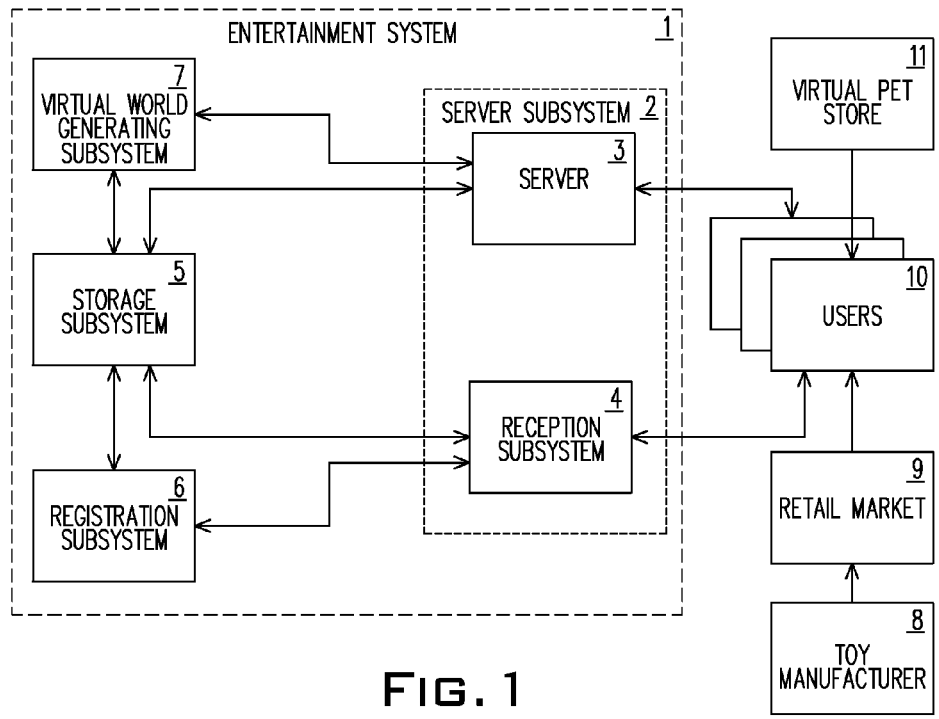
FIG. 1 shows a schematic block diagram of an example embodiment of an entertainment system and its interactions with some external entities.

Described herein is a method for providing temporary access to a membership-based website in order to provide potential members with a preview of the website.

According to an example embodiment, an entertainment system is provided including an online "virtual world" where the user of a toy or other product, such as a figurine or trading card, can register the product using a unique registration or registration code provided with the product at purchase, register or adopt the product online, and play with a virtual representation of the product (a "virtual product") in the virtual world. The registration code may be provided in any way, including printed on a tag attached to the product, electronically stored in a memory attached to the product, or the like. In some embodiments, the "virtual world" can be implemented using an interactive website via a user computer connected to the Internet. In this manner, a user can play with the virtual toy in a computer generated fantasy world (i.e., the virtual world). As described in more detail throughout the specification and in United States Patent Application Publication No. 2005/0192864 to Ganz, the user enters the registration code that is provided with a toy and this causes a virtual toy that corresponds to the toy to be created on the website.

The term "product" could include any type of product including a toy, a trading card, a figurine, or any other consumer good that can be purchased or otherwise obtained. The term "toy" could be any type of toy (for example, those used by a child), including, for example, plush toys (including but not limited to stuffed animals, fantasy figures, dinosaurs, vehicles, dolls, etc.), along with other types of toys (including, but not limited to, vehicles such as cars and trucks; action figures such as army figures, monsters, sports figures, fantasy figures, dinosaurs; and dolls, etc.). The term "character" could include any type of character, such as a real or imaginary person, a real or imaginary pet animal, a robot or other real or imaginary animate object.

Graphics, animation, sound, and even recorded images might be utilized to generate the virtual world and virtual product. Even live images might be utilized, if desired. In addition, other sources of material can also be utilized. In essence, the virtual world creates an interactive playland for the product owner to encourage imagination using the product, and at the same time, provide an incentive to purchase additional products or encourage additional individuals to also purchase products in order to participate in the entertainment system.

Throughout this disclosure, the term "virtual" is used, for example, to describe the user viewable/hearable material presented to the user on the user computer from data and/or computer programs and commands generated and/or provided by the entertainment system, to the user computer running one or more computer applications (e.g., a web browser with the appropriate plug-ins, applets, and/or other support programs, etc.). The entertainment system provides the data and/or programs, via a communication network connected to the entertainment system and the user computer (e.g., the Internet).

The term "virtual" does not necessarily mean that the displayed item is not "real", because the displayed item could, for example, be a video or picture of a real item, for example. Furthermore, the "virtual world" is presented using "real" physical phenomena (e.g., light and sound), and is impacted by "real" user interactions (e.g., mouse and keyboard manipulations). Rather, the term "virtual" is used to describe the computer generated and/or provided presentation to the user, including both visual and audible effects, via the user computer. It is a "virtual world" in the sense that it is primarily a computer presented fantasy world with which the user can interact via manipulations of the user computer. In this manner, the "virtual" items of the virtual world can be presented as interacting with each other and with the user. Furthermore, the user is provided access to games and other activities via the computer generated systems.

In an example embodiment, the user buys a product (such as a plush animal, a trading card or a figurine), registers the product in a website at an URL listed on the product or product packaging, or a tag on the product. The entertainment system serves or delivers interactive content, such as a website that provides the virtual world content and virtual character content to the user using various web pages. The virtual character content includes, for example, a biography of the product and a virtual character that is a virtual representation or replica of the product (the virtual product) using graphics and/or sound (such as an animated image, for example). The virtual world content allows the user, using the virtual character, to participate in various activities, such as games, chat rooms, various maintenance activities, and the like. The entertainment system also provides a virtual means for maintaining the "health and well-being" of the character through the various maintenance activities, such as virtual feeding and playing, virtual shopping, and virtual medical checkups, for example.

More specifically, the entertainment system 1 of the example embodiment utilizes a server subsystem including a web server subsystem for generating at least one of dynamic and static web pages as is known in the art, and for receiving data and/or commands from the user computer. One or more databases support the functioning of this server subsystem. The web server utilizes various scripting or other executable programs for providing dynamic content to the user's computer, which is attached to the web server via some computer network, such as the Internet, for example. The web server can also utilize various animated motion programs, such as a Flash program, java scripts, etc., to provide dynamic content to the user.

FIG. 1 shows a top-level block diagram of the entertainment system 1, interacting with various users 10. The users 10 are those who have previously purchased and registered one or more products from a retail merchant 9, who obtained the products from a manufacturer 8, or via a distributor. Alternatively, the users 10 may purchase a virtual character or pet, which is an image of a character or pet, from a virtual store 11. According to the example embodiment, a user who has purchased a product or virtual pet will be taken through an adoption process during which the user creates a username and password and is provided with a premium or paid user account, along with a virtual replica of the product or a premium virtual character. The username and password are used to authenticate or log a user in to the website with the corresponding user account, providing them access to and control over the corresponding virtual character. Access to virtual world activities on the website is provided exclusively to users that are successfully authenticated to an authorized user accounts, such as the premium user account described above or the temporary user account that is described below. Users without such authorized user accounts are limited to viewing informational content about the website, but cannot access the activities or virtual characters provided in the virtual world.

According to the example embodiment, if the user has not yet purchased a product from a merchant 9 or a virtual character from a virtual store 11, the user can request a temporary user account, also referred to as a "tier 0" membership, and receive access to various aspects of the website for a limited time. As described below in more detail, the temporary user account allows the user to adopt a generic virtual character or pet with which the user can interact with the virtual world and various activities provided therein.

With continued reference to FIG. 1, the entertainment system 1 is comprised of a server subsystem 2 for interacting with the users 10 via a user computer being operated by the user. The server subsystem can utilize a server 3, for serving content, including web pages, data, commands, and/or programs, for example, to the user computer. In addition, the server subsystem can include a reception subsystem 4, for receiving information and commands from the users 10. Alternatively, the server 3 and reception subsystem 4 might be combined into a single computer application, such as a commercially available web server, for example, running on one or more computers. The current system will utilize commercially available applications to implement much of the server subsystem. These systems can run on any conventional computer and be stored on any tangible medium such as a hard drive.

The entertainment system 1 also comprises a storage subsystem 5, for storing system data, user IDs and passwords, product registration codes, personalized user information, etc. utilized by the various subsystems. The storage subsystem 5 of the current system will utilize a commercially available database application running on commercially available hardware, for example.

A registration subsystem 6 is used for registering the user and the user's product into the entertainment system, so that the user has access to restricted portions of the entertainment system. The registration subsystem 6 may utilize its own dedicated application and hardware, or could be combined with or share the server subsystem 2 applications and/or hardware. The registration subsystem 6 validates the registration code by comparing it to stored data relating to a plurality of registration codes each representing a product for sale. As described in more detailed below, the registration subsystem 6 also permits registration of temporary user accounts.

A virtual world providing subsystem 7 generates and/or provides the virtual world data and virtual character data to be served by the server 3 to the users 10 for use in displaying a virtual world on the user's computers. Portions of this data may be generated on the fly in response to user interactions, and portions are likely to be obtained and/or derived from data stored in the storage subsystem 5. For example, in the example embodiment, items owned by the user (the items in the dock for example), the virtual room state (virtual furniture in the room for example), virtual cash, health, happiness, hunger parameters are all examples of "stored data." Data generated on the fly, including a position in the room and arcade game scores also get stored.

Again, the virtual world providing subsystem 7 may utilize unique applications and/or hardware, or may be combined with one or more of the registration subsystem 6 and/or the server subsystem 2 applications and hardware.

More specific details relating to an entertainment system which can be utilized according to the example embodiment are set forth, for example, in United States Patent Application Publication No. 2005/0192864 to Ganz, the entire contents of the disclosure of which is incorporated by reference herein. The entertainment system disclosed therein may provide some general services and features open to the public, such as information about the products and where to purchase them, a description of the features of the website, and other similar information. Accordingly, many of the features of the entertainment system are restricted to registered users to encourage product purchase.

Figure 2:
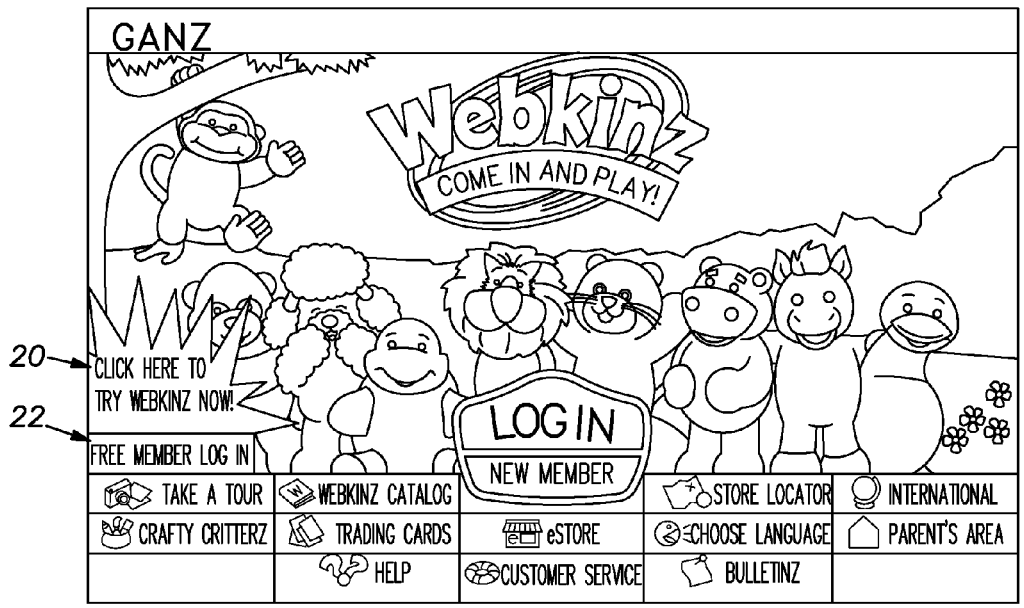
FIG. 2 shows an example starting webpage for an entertainment system.

According to the present disclosure, the above entertainment system 1 is modified to offer free access to users for a limited period of time in order to allow users to experience various aspects of the website before purchasing a product or virtual character. With reference to FIG. 2, an example starting webpage for the entertainment system 1 according to an example embodiment includes a selectable area on the screen 20, e.g., a trial membership callout or button. Upon clicking the callout 20, the user is given the opportunity to request a temporary user account by going through an abbreviated adoption process, as shown by way of the example in the registration screens of FIGS. 3A, 3B, 3C and 3D.

Figure 3A:
FIGS. 3A, 3B, 3C and 3D show example registration screens for an abbreviated adoption process for adopting a generic virtual character.

FIG. 3A is a welcome screen for "free members" which explains that the user can play with a pet for a short while, and learn a little about Webkinz World®. The user presses "OK" to continue with the adoption process.

Figure 3B:
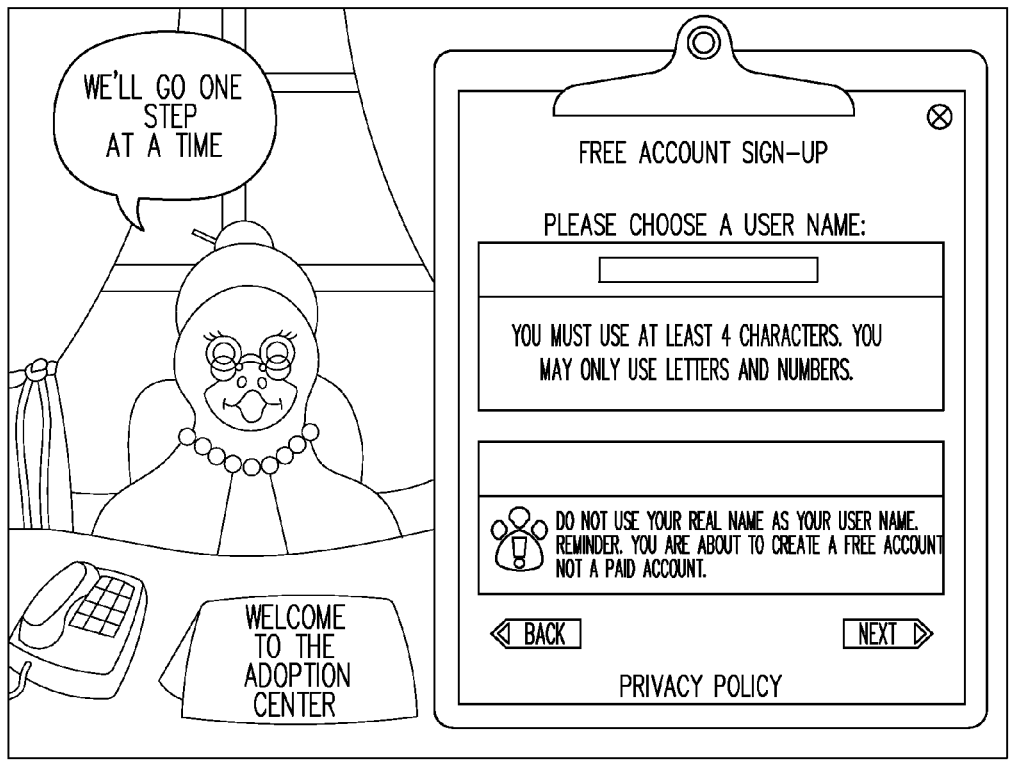
Figure 3C:
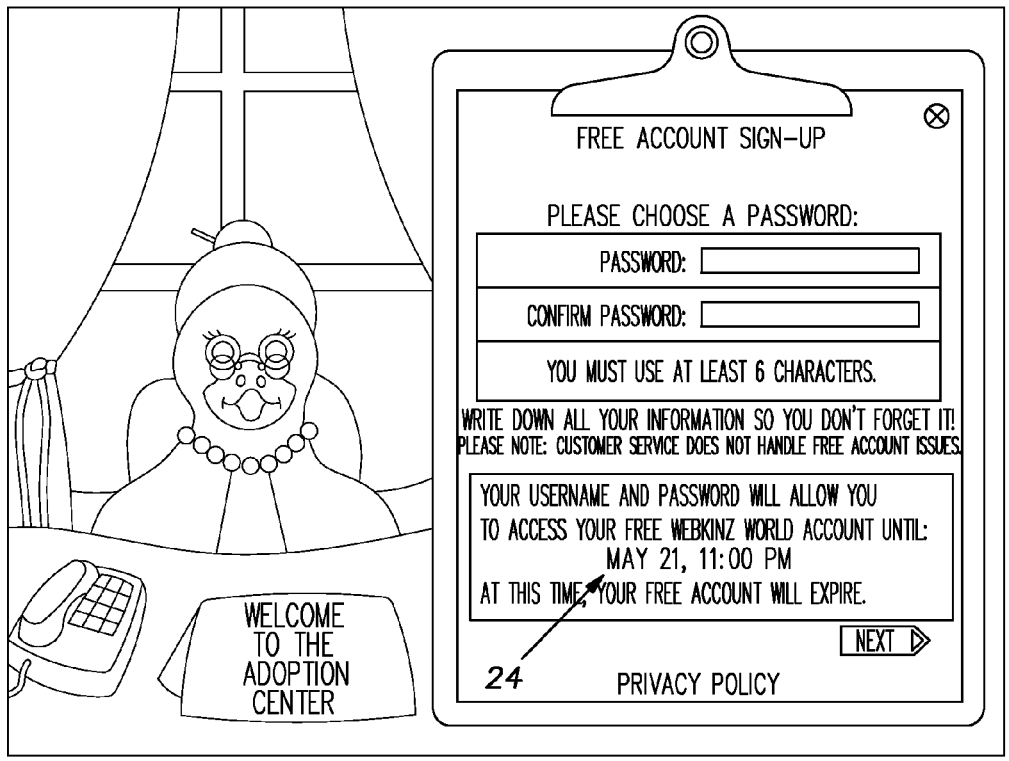

During the abbreviated adoption process, as shown in FIGS. 3B and 3C, the user creates a user name, e.g., temporary username, and a password which will be associated with the temporary user account that is created for the user. In one embodiment, the registration subsystem 6 compares the temporary username received by the reception subsystem 4 to all of the usernames in the entertainment system 1 to ensure that the temporary username is unique among all registered usernames, including both temporary usernames and premium usernames. If the registration subsystem 6 determines that a duplicate username exists in the system 1, an error message will be displayed to the user and the user will be required to choose a unique username in order to continue the abbreviated adoption process.

Temporary user accounts are only available for limited amount of time after they are created. A time-based system job, or "chron job," is performed at a set interval, such as every night at midnight, by the system 1. When the chron job is run, all of the temporary user accounts are disabled and purged from the system, allowing the temporary usernames to be reused for future temporary user accounts and premium user accounts. As shown in FIG. 3C, during the abbreviated adoption process, the user is informed of the time and date when the temporary user account will expire, as shown at 24. According to an example embodiment, the system 1 determines this time and date by adding X to the current time and date. X is the amount of time remaining until the next chron job is scheduled to be performed.

According to another embodiment, each of the temporary user accounts last a specified period of time, e.g., 24 hours, or a week, expiring that amount of time after they are created.

Figure 3D:
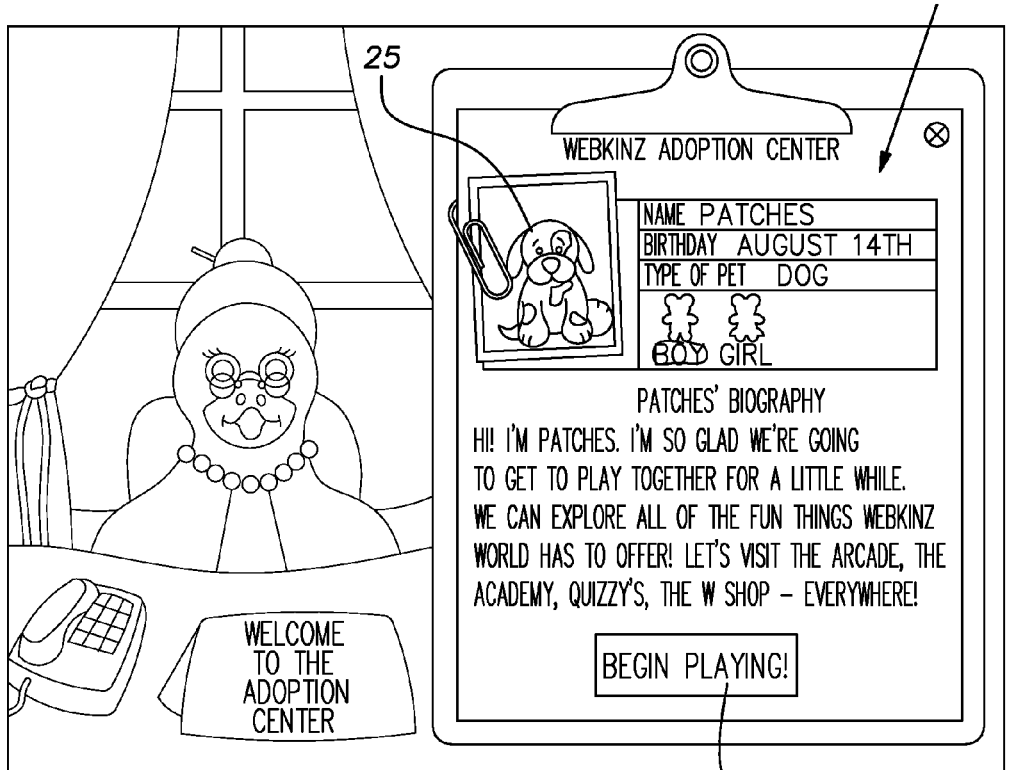

As shown in FIG. 3D, the user will be given a generic virtual character or pet 25, also referred to as a "Mutt," to play with. The generic virtual character 25 is associated with the temporary user account. According to the example embodiment, the Mutt 25 named Patches is shown on the screen at the conclusion of the abbreviated adoption process, along with the Mutt's biography or "bio" 26. According to an embodiment, every temporary user account in the system is provided with the same generic virtual character or Mutt 25. For example, the Mutt's bio 26 always has the same basic visual appearance and includes the same name (Patches) and the same information, as shown in FIG. 3D. Further, the visual appearance of the generic virtual character 25 is not the same as the visual appearances of any of the virtual replicas provided on the website. Thus, the generic virtual character is not a virtual replica of any real world product.

Upon completion of the abbreviated adoption process, the user clicks the "Begin Playing" button 28 in order to begin controlling and interacting the generic virtual character 25 with various activities provided on the website. During the limited time when the temporary user account is active, the user can also return to the website after logging out and log into the temporary user account via a special button 22 on the starting webpage labeled "Free Member Login" (FIG. 2).

Figure 4:
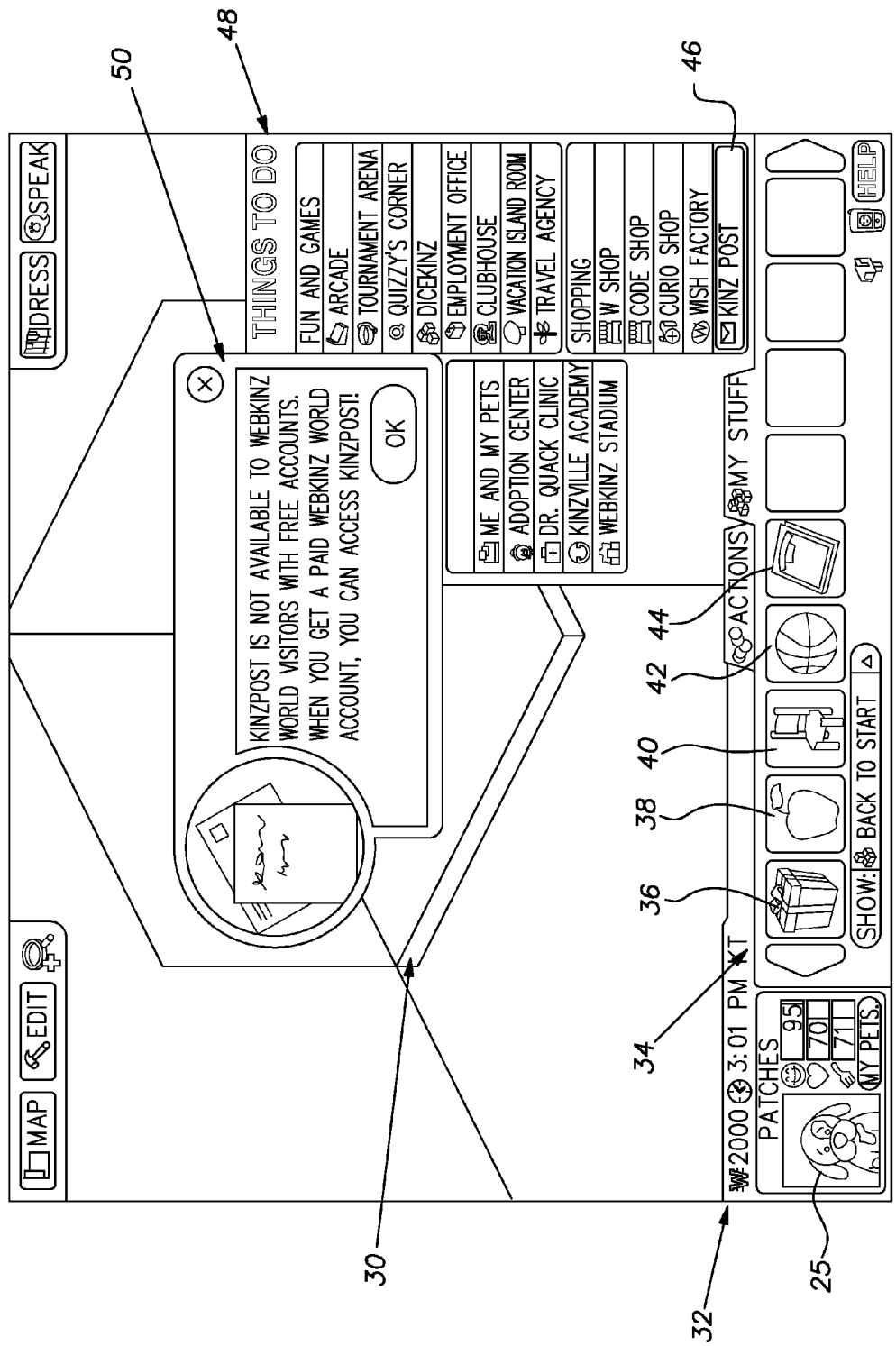
FIGS. 4 and 5 show example screens for accessing virtual world content on a website for an entertainment system.

As shown in FIG. 4, after the abbreviated adoption process, the temporary user account will be provided with various virtual items that the generic virtual character can interact with, including a virtual room 30 and an amount of virtual currency 32 that can be used to purchase virtual items. Additional virtual items can also be associated with the temporary user account upon completion of the abbreviated registration process. These items will appear in the user's dock 34. For example, items of this type may include a gift package 36, an apple 38, a chair 40, a basketball 42, and a guide book 44.

According the example embodiment, premium or paid user accounts can be provided with full access to all activities and areas of the website. Temporary user accounts are also provided with full access to most of the areas and activities on the website, with some exceptions as described below.

Temporary user accounts may be provided with only limited access to certain areas or activities on the website. For example, using a temporary user account, a user is prevented from interacting the associated generic virtual character with any of the virtual replicas or premium virtual characters. Interaction can include communicating, seeing, participating in the same game or event, or the like. For instance, the premium virtual characters can be hidden from view of the generic virtual characters. Alternatively or in addition, both generic and premium virtual characters can see each other but communication may not be allowed between generic and premium virtual characters. However, in order to try out various activities that involve virtual character interaction, the temporary user account will allow the user to interact his/her associated generic virtual characters with other generic virtual characters such as visit their rooms, give gifts, trade items, or play games. However, in order to maintain safety on the website, communication between generic virtual characters may also be limited or entirely restricted. For instance, communication may be limited to only a few pre-existing approved phrases or words that the user can either choose from or that appear automatically when the generic virtual character performs an action. For example, a pre-written phrases such as "Here is a gift" might be automatically included with one generic virtual character's gift to another generic virtual character. Another example is "Will you trade my (selected) item for your (selected) item?" might appear along with a trade request for another generic virtual item, or alternatively, for a premium virtual item.

The generic virtual characters can be wholly prohibited from certain activities on the site. One example is a chat function. Unlike premium virtual characters that have more freedom in their chat capabilities during such activities, the generic virtual character may not be able to freely chat or otherwise freely communicate with another generic virtual character belonging to another temporary user account. Temporary account holders may not be permitted to enter text for communicating purposes in any activity where communication is otherwise permitted for premium users and their virtual characters. Therefore, the temporary account holder can either be excluded from participating in such activities where communication with others is involved or can still be permitted to participate without communication aspect enabled or with strict limitations to the communication as described above.

One reason for this limit is to mitigate and/or entirely prevent misbehavior in a chat room. Misbehavior by a premium character in a chat room may lead to that character being banned or restricted from entering the chat room or can lead to account suspension or revocation. However, that punishment could be easily circumvented if the character owner could immediately get a free temporary account and go right back into the chat room.

Some activities may be completely unavailable to temporary user accounts. For example, premium chat rooms that are available to premium user accounts can be made unavailable to temporary user accounts. Activities that are unavailable to temporary user accounts can optionally be made visible to users of temporary user accounts for informational purposes only, even though the generic virtual characters are unable to select, interact with, or participate in the activities. For example, as shown in FIG. 4, when a user with a temporary user account attempts to access an email function 46 displayed on a menu 48, an error message 50 informs the user that this activity is only available to premium user accounts. More generally, any activity which has penalties for bad user behavior may not be available at all to the generic characters.

Figure 5:
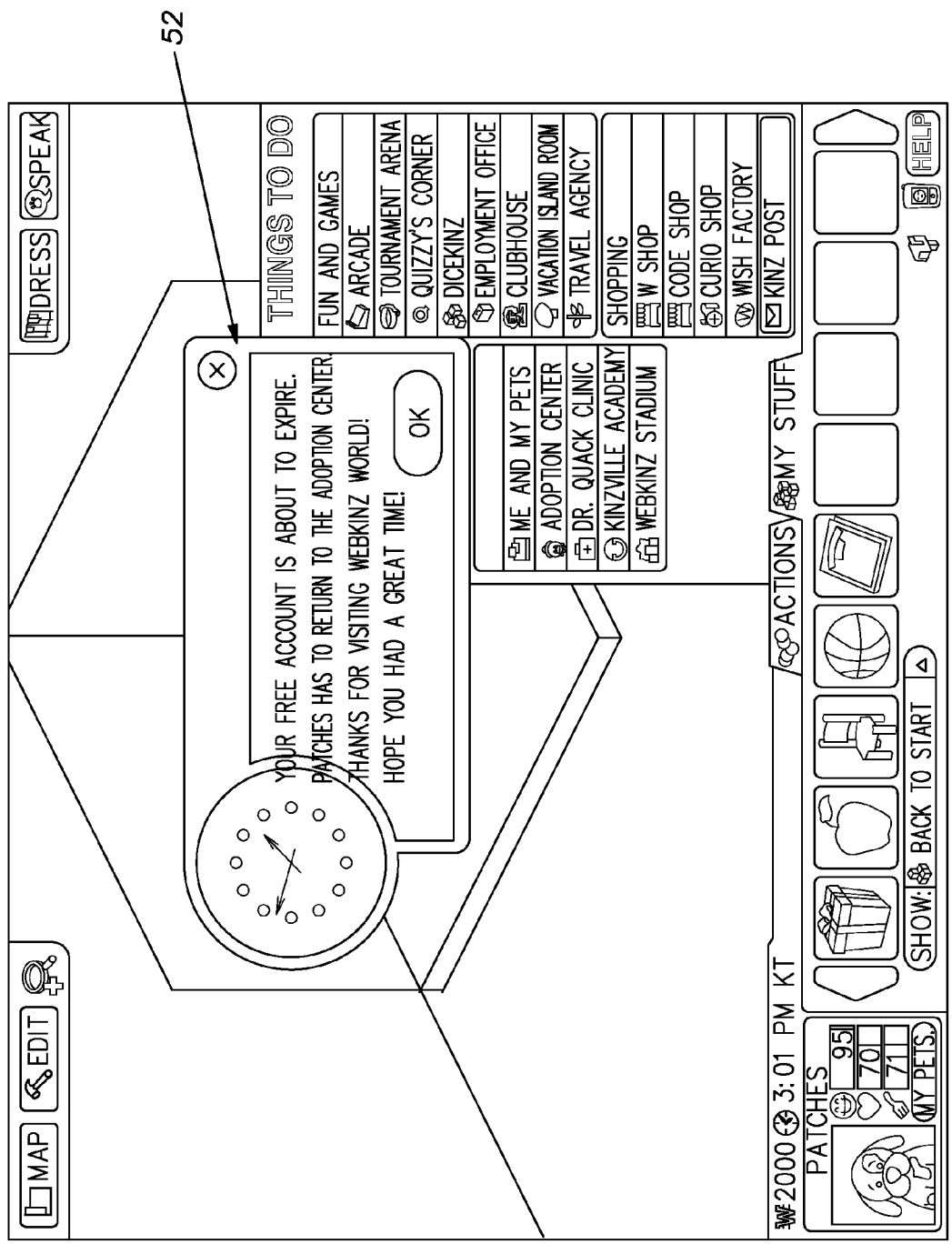

As shown in FIG. 5, a short period before the time 24 when the temporary user account is set to expire, the system displays a warning message 52 to inform the user that their playtime will be ending. Once the temporary user account expires, the user is automatically logged out and returned to a login screen.

According to an example embodiment, after the temporary user account expires, the user may purchase a premium virtual character at a virtual store 11 or purchase a product from a merchant 9 and use the associated code to create a premium user account and complete the full adoption process to obtain a virtual replica of the product. Alternatively, the user could be allowed to sign up for another temporary user account, but user would have to start completely over, since any virtual currency earned and virtual items purchased using the previous temporary user account would no longer exist. This embodiment does not permit the temporary account to be extended or recreated. Therefore, if the user has enjoyed using the website with the temporary account, the user is encouraged to obtain a premium user account in order to be able to have continued access an account and the associated virtual characters and item, which gives the user, for example, the ability to regularly play with and develop the virtual character, the ability to retain and add assets and features to the user's account, such as virtual items, virtual rooms, virtual currency, and the like, the ability to maintain a history of played games and high scores, and the ability to use the virtual character to have ongoing relationships with other user's virtual characters, such as by maintaining a list of friends, sending emails to and chatting with other premium users, and the like. Other incentives to users for obtaining a premium user account after the expiration of the temporary user account will be apparent to one of ordinary skill in the art.

Another embodiment may allow extensions of the temporary accounts.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

The invention claimed is:

1. A method comprising steps of:
serving virtual world content stored on a server to a website over the Internet, the virtual world content including a plurality of activities in a virtual world and virtual character content, the virtual character content including a plurality of virtual characters that interact with the plurality of activities in the virtual world, the plurality of virtual characters including a plurality of virtual replicas and a plurality of generic virtual characters;
validating a registration code that is associated with a product;
responsive to the validating the registration code, permitting user control of a virtual replica of the product in the virtual world content via a user account, the virtual replica being one of the plurality of virtual replicas, and the user account being one of a plurality of premium user accounts;
responsive to a request for a temporary user account without said validating said registration code, permitting user control of one of the plurality of generic virtual characters via the temporary user account for a limited time, and the temporary user account being one of a plurality of temporary user accounts;
permitting interaction of the virtual replica with another one of the plurality of virtual replicas in the virtual world;
preventing all interaction of any of the plurality of generic virtual characters with any of the plurality of virtual replicas;
disabling the temporary user account after the limited time, wherein the temporary user account cannot be reenabled after the disabling and wherein the temporary user account is not extendible past the limited time; and
after the limited time, allowing a user to obtain another temporary account that permits user control to another one of the plurality of generic virtual characters via the another temporary user account for another limited time, wherein access to the plurality of activities via the virtual world content is provided exclusively to a plurality of authorized user accounts, the plurality of authorized user accounts consisting of the plurality of premium user accounts and the plurality of temporary user accounts, and
wherein each of the temporary user accounts expires at a time that is based on when the corresponding temporary user account was created, wherein one of the temporary user accounts expires at a different time than another one of the temporary user accounts.

2. The method of claim 1, further comprising steps of:
responsive to a further request for another temporary user account, permitting user control of another one of the plurality of generic virtual characters via said another temporary user account; and
permitting interaction of said one of the plurality of generic virtual characters with said another one of the plurality of generic virtual characters in the virtual world.

3. The method of claim 1, further comprising a step of preventing the plurality of generic virtual characters from interacting with at least one of the plurality of activities, wherein said plurality of virtual replicas is permitted to interact with said at least one of the plurality of activities.

4. The method of claim 1, further comprising a step of limiting interaction of the plurality of generic virtual characters with at least one of the plurality of activities, wherein said plurality of virtual replicas is permitted unlimited interaction with said at least one of the plurality of activities.

5. The method of claim 1, wherein each of the plurality of generic virtual characters has a visual appearance that is different from all of the plurality of virtual replicas.

6. The method of claim 5, wherein the plurality of generic virtual characters all have a same visual appearance.

7. A computer system comprising:
a virtual world subsystem that generates virtual world content using the computer system including a plurality of activities in a virtual world and virtual character content, the virtual character content including a plurality of virtual characters that interact with the plurality of activities in the virtual world, the plurality of virtual characters including a plurality of virtual replicas and a plurality of generic virtual characters;
a storage subsystem that stores the virtual world content on the computer system;
a registration subsystem on the computer system validating a registration code that is associated with a product; and
a server subsystem that serves the virtual world content from the computer system via a computer network to a website on the Internet and, responsive to the validating the registration code, permits user control of a virtual replica of the product in the virtual world content via a user account, the virtual replica being one of the plurality of virtual replicas, and the user account being one of a plurality of premium user accounts, wherein, responsive to a request for a temporary user account without said validating said registration code being received by the registration subsystem, the virtual world subsystem permits user control of one of the plurality of generic virtual characters via the temporary user account for a limited time, and the temporary user account being one of a plurality of temporary user accounts, wherein the virtual world subsystem permits interaction of the virtual replica with another one of the plurality of virtual replicas in the virtual world, wherein the virtual world subsystem prevents all interaction of any of the plurality of generic virtual characters with any of the plurality of virtual replicas, wherein the virtual world subsystem provide access to the plurality of activities via the virtual world content exclusively to a plurality of authorized user accounts, the plurality of authorized user accounts consisting of the plurality of premium user accounts and the plurality of temporary user accounts, wherein the computer system disables the temporary user account after the limited time, wherein the computer system prevents the temporary user account from being reenabled after being disabled, and wherein the computer system prevents the temporary user account from being extended past the limited time, and wherein after the limited time, the computer system allows a user of the temporary account to obtain another temporary account that permits user control of another one of the plurality of generic virtual characters via the another temporary user account for another limited time, and wherein each of the temporary user accounts expires at a time that is based on when the corresponding temporary user account was created, wherein one of the temporary user accounts expires at a different time than another one of the temporary user accounts.

8. The computer system of claim 7, wherein the virtual world subsystem prevents the plurality of generic virtual characters from interacting with at least one of the plurality of activities, wherein the virtual world subsystem permits said plurality of virtual replicas to interact with said at least one of the plurality of activities.

9. The computer system of claim 7, wherein the virtual world subsystem limits interaction of the plurality of generic virtual characters with at least one of the plurality of activities, wherein the virtual world subsystem permits unlimited interaction of said plurality of virtual replicas with said at least one of the plurality of activities.

10. The computer system of claim 7, wherein each of the plurality of generic virtual characters has a visual appearance that is different from all of the plurality of virtual replicas.

11. The computer system of claim 10, wherein the plurality of generic virtual characters all have a same visual appearance.

12. The computer system of claim 7, wherein the virtual world subsystem prevents at least some interaction comprising limiting communication between any of the plurality of generic virtual characters with any of the plurality of virtual replicas and limiting communication between generic virtual characters.

13. The computer system of claim 7, wherein any virtual currency earned and virtual items purchased using the temporary user account are no longer accessible after the limited time.

14. A method comprising steps of:

serving virtual world content stored on a server to a website over the Internet, the virtual world content including a plurality of activities in a virtual world and virtual character content, the virtual character content including a plurality of virtual characters that interact with the virtual world content forming the plurality of activities in the virtual world, the plurality of virtual characters including a plurality of premium virtual characters and a plurality of generic virtual characters;

responsive to authenticating one of a plurality of paid user accounts which requires a user having paid for access, permitting user control of a premium virtual character via said one of the plurality of paid user accounts, the premium virtual character being one of the plurality of premium virtual characters;

responsive to a request for a temporary user account which does not require a user having paid for access, creating a temporary user account and permitting user control of a generic virtual character via the temporary user account, where the temporary user account permits said user control only for a limited amount of time after the temporary account is created, the generic virtual character having a generic visual appearance that is different from visual appearances of the plurality of premium virtual characters, and the temporary user account being one of a plurality of temporary user accounts;

disabling the temporary user account after the limited amount of time, wherein the temporary user account cannot be reenabled after the disabling and wherein the temporary user account is not extendible past the limited amount of time, wherein access to the plurality of activities via the virtual world content is provided exclusively to a plurality of authorized user accounts, the plurality of authorized user accounts consisting of the plurality of paid user accounts and the plurality of temporary user accounts, wherein each of the temporary user accounts expires at a time that is based on when the corresponding temporary user account was created, and wherein the plurality of temporary user accounts each expire at different times depending on when the temporary user account was created.

15. The method of claim 14, wherein the plurality of temporary user accounts each provide user control of generic virtual characters that all have a same visual appearance and where the premium virtual characters have different visual appearances.

16. The method of claim 14, further comprising steps of:
permitting interaction of one of the plurality of premium virtual characters with another one of the plurality of premium virtual characters in the virtual world; and
preventing interaction of any of the plurality of generic virtual characters with any of the plurality of premium virtual characters.

17. The method of claim 14, further comprising steps of:
responsive to a further request for another temporary user account, permitting user control of another one of the plurality of generic virtual characters via said another temporary user account; and
permitting interaction of said one of the plurality of generic virtual characters with said another one of the plurality of generic virtual characters in the virtual world.

18. The method of claim 14, further comprising a step of preventing the plurality of generic virtual characters from interacting with at least one of the plurality of activities, wherein said plurality of premium virtual characters is permitted to interact with said at least one of the plurality of activities.

19. The method of claim 14, wherein the premium virtual character is a virtual replica of a real world product and the generic virtual character is not a virtual replica of any real world product.

20. The method of claim 19, wherein a registration code is associated with the real world product and said authenticating comprises validating said registration code, and wherein said virtual replica has a first visual appearance that corresponds to a second visual appearance of the real world product.

* * * * *